United States Patent [19]

Reich

[11] 3,803,055

[45] Apr. 9, 1974

[54] CATALYST FOR PREPARING SATURATED ALCOHOLS

[75] Inventor: Manfred Reich, Marl, Germany

[73] Assignee: Chemische Werke Huels, A.G., Marl, Germany

[22] Filed: July 6, 1972

[21] Appl. No.: 269,461

Related U.S. Application Data

[62] Division of Ser. No. 791,178, Jan. 14, 1969, abandoned.

[30] Foreign Application Priority Data

Jan. 17, 1968  Germany............................ 1643856

[52] U.S. Cl................................. 252/454, 252/459
[51] Int. Cl...... B01j 11/40, B01j 11/22, B01j 11/32
[58] Field of Search............................ 252/454, 459

[56] References Cited

UNITED STATES PATENTS 3,514,492   5/1970   Juguin et al. .................... 252/454 X
3,573,228   3/1971   Holmes et al...................... 252/454

*Primary Examiner*—C. F. Dees
*Attorney, Agent, or Firm*—Millen, Raptes & White

[57] ABSTRACT

Copper and/or nickel catalysts on a silica gel support suitable for the catalytic hydrogenation of aliphatic or cycloaliphatic aldehydes, ketones, or mixtures thereof are improved by using as the support silica gel having a surface pH of 6–10, preferably 7. The resultant catalysts are thereby rendered less sensitive to temperature fluctuations and contaminants and are amenable to regeneration.

22 Claims, No Drawings

_3,803,055_

CATALYST FOR PREPARING SATURATED ALCOHOLS

This is a division of application Ser. No. 791,178, filed Jan. 14, 1969 now abandoned.

BACKGROUND OF THE INVENTION

1. Field of Invention

This invention relates to an improved catalyst for the hydrogenation of aldehydes or ketones for the production of saturated aliphatic alcohols.

2. Description of the Prior Art

In general, it is conventional to produce saturated alcohols by the catalytic hydrogenation of the corresponding saturated or unsaturated aldehydes or ketones. For example, in German Pat. Nos. 838,746 and 848,944, the hydrogenation of crotonic aldehyde is conducted in the presence of a supported nickel catalyst, there being produced under certain conditions a mixture of saturated alcohols in a total yield of about 90 percent.

In German Pat. No. 931,827, another process is described wherein unsaturated aldehydes are hydrogenated in the vapor phase in two stages with different catalysts, namely, in the first stage with a copper-nickel catalyst supported on a carrier, and in the second stage with a modified supported copper catalyst. In this process, saturated alcohols are obtained along with a considerable proportion of saturated aldehydes, unsaturated aldehydes, and unsaturated alcohols. The proportion of unsaturated alcohol poses a substantial problem when attempting to separate the saturated alcohol by distillation.

In other processes, leading to purer products a pure supported copper catalyst is employed in the first stage during the hydrogenation of unsaturated aldehydes in the vapor phase (which catalyst can optionally contain a conventional modifying agent); and in the second stage, a supported copper-nickel catalyst or a supported catalyst of pure nickel is employed (German Pat. Nos. 1,152,393 and 1,161,250). In accordance with the process of British Pat. 938,028, the above-mentioned catalyst system is employed in the hydrogenation of saturated aldehydes in the vapor phase.

According to the process of French Pat. No. 1,349,816 (corresponding to British Pat. No. 962,412), a supported pure copper catalyst is utilized in the first stage for the hydrogenation of unsaturated aldehydes in the vapor phase, and in the second stage, a palladium catalyst is used. The saturated alcohols obtained in accordance with this process, however, still contain traceable amounts of unsaturated compounds, and the proportion of saturated aldehydes is on the order of magnitude of per cent values.

A further process is known for the catalytic hydrogenation of higher aldehydes to alcohols in the liquid phase (German Published Application No. 1,231,227). However, this process is expensive, since it operates in several stages and under increased pressure.

In Belgian Pat. No. 690,250, still another process is described for the preparation of saturated aliphatic alcohols by the hydrogenation of aldehydes in the vapor phase in the presence of a supported copper-nickel catalyst of a specific composition, wherein silica gel is employed as the support.

Finally, in Belgian Pat. No. 690,249, a process is disclosed for the production of saturated aliphatic alcohols by the catalytic hydrogenation of aldehydes in the vapor phase, the characteristic feature of this process being that a copper-nickel catalyst applied to a silica gel support is first employed, and then a nickel and/or palladium catalyst is subsequently utilized. This process permits the production of saturated alcohols in good yields under mild conditions, the purity thereof being such that the thus-obtained alcohols can be used in many cases without further intermediate purification. However, one disadvantage is the great sensitivity of such silica gel-supported catalysts to fluctuations in operating conditions (as are commonly experienced in industrial processes) such as increased temperatures, and also to contaminants which can readily cause permanent damage to the catalysts. After a high-temperature treatment of the catalyst, the formation of by-product, using such catalyst, is generally considerably increased; in particular, larger proportions of hydrocarbons and ethers are formed. Consequently, such a catalyst is not amenable to regeneration by burning off the impurities at an elevated temperature, for example, 300°–400°C, and subsequent reduction of the thus-produced oxides in a hydrogen stream.

SUMMARY OF THE INVENTION

A principal object of this invention is thus to provide an improved for the catalytic hydrogenation of aliphatic or cycloaliphatic aldehydes, ketones, or mixtures thereof to saturated alcohols.

Another main object is to provide catalysts, in particular catalyst supports, which are relatively insensitive to increased temperatures and contaminants and are amenable to high temperature regeneration.

Upon further study of the specification and claims, other objects and advantages of the present invention will become apparent.

To attain the above objects, there is provided a process for the preparation of saturated aliphatic alcohols by the hydrogenation of saturated and/or unsaturated aldehydes and/or ketones, preferably in the vapor phase, in the presence of catalysts with silica gel as the support and containing copper and/or nickel and, optionally, conventional modifiers, which catalysts can also be employed together with other hydrogenation catalysts, wherein the improvement comprises using as the support a silica gel having a surface pH of 6–10, preferably about 7.

Catalysts of the above-mentioned composition having the claimed pH range on the surface are distinguished by lower sensitivity, they are high temperature-resistant, not adversely affected by regeneration, and are relatively insensitive to contaminants which contact the catalyst during the reaction.

Furthermore, by utilizing the aforesaid process, the formation of by-products, such as hydrocarbons and ethers, is suppressed to such an extent that it is negligible. In contrast, if the surface of the silica gel employed for the catalyst exhibits a pH outside of the claimed pH range, then there occurs a substantial increase in the above-described compounds as well as esters in the alkaline zone.

The surface of commercially available silica gel mostly exhibits pH values which are in the acidic range, predominantly 3–5. The pH of the silica gel employed as the support material is determined in a simple manner, for example, by coloring the powdered support material with commercial indicator mixture and reading-off the pH value from the resulting color hue. However, it is also possible to determine the acidity of the acidic locations by titration, for example, in accordance with the method by O. Johnson (J. Phys. Chem. 59 (1955), p. 827).

To obtain the critical pH range of the silica gel surface for the present invention, commercial silica gels are treated with alkalis, for example, sodium or potassium hydroxide, which is applied from an aqueous solution onto the support material. Instead of sodium or potassium hydroxide, there also can be used other basic compounds, especially hydroxides of other alkali or alkaline earth metals like magnesium, calcium and so on or salts of the above mentioned metals with weak acids like carbonates, bicarbonates, acetates and formates.

Ammonia generally is used for raising the solubility of the employed copper-and nickel-salts, but its effect of neutralization soon decreases and is completely lost after regeneration process.

The required amount of alkali necessary to set the surface of the support materials to the desired pH of between 6 and 10, suitably about 7, is determined, for example, by the previously cited titration method. In most cases, a slight excess of alkali will be advantageous, since, for instance, the titration method affects only the locations which are more strongly acidic, as can be seen from a subsequent check of the pH value by the indicator color method. However, it is also possible to produce a number of specimens of the support material to be employed, impregnated with different concentrations of alkali, for example, with 0.1 percent; 0.2 percent; 0.3 percent, etc. by weight of NaOH, and to subject these specimens, after drying, to the indicator color test, the specimen having the desired pH revealing the amount of alkali to be applied.

The quantity of alkali determined for use in adjusting the pH value is advantageously applied from an aqueous solution onto the support, most advantageously before the support is impregnated with the hydrogenation catalyst means, or simultaneously with the latter. Although a post-impregnation of the material already impregnated with the hydrogenation catalyst means is possible, this procedure is not very suitable, since in that case the acidic centers are, in certain circumstances, not uniformly affected by the alkalinization.

The silica gel supported catalysts are produced by applying the appropriate copper and/or nickel salts and the optional modifying additives to the support, wherein care must be taken that the pH of the support surface is not essentially changed. The compounds are applied to the support preferably in the form of aqueous solutions thereof, which latter can be optionally mixed with ammonia to improve the solubility; such application is performed either simultaneously with the amount of alkali required to adjust the correct pH value, or after being mixed with alkali. After the thus-obtained catalysts are dried and optionally treated at elevated temperature in an air or nitrogen stream, for example, in order to decompose salts into oxides, these catalysts are reduced in the conventional manner in a hydrogen stream or by means of other reducing agents.

The proportion of the activating metals, namely, copper and/or nickel, in the total weight of the supported catalyst is limited by the absorption capacity of the silica gel for these elements, or the compounds thereof, and is primarily 1–25 percent by weight. Conventional modifiers are, for example, chromium-containing compounds.

Suitable starting substances are saturated and/or unsaturated aldehydes, such as acetaldehyde, propionaldehyde, butyraldehyde, pentanal, hexanal, heptanal, octanal, nonanal, decanal, crotonaldehyde, hexenal, hexadienal, octenal, as well as the derivatives of these compounds isomeric with respect to structure and position, such as isobutyraldehyde, 2-vinyl-crotonaldehyde, 2-ethylhexenal-1. However, other aldehydes can also be employed, such as higher molecular aldehydes, or ring-containing or bifunctional aldehydes, or those containing further functional groups, such as hydroxyl groups, for example.

Furthermore suitable are saturated and/or unsaturated ketones such as methyl ethyl ketone, dipropyl ketone, ethyl propyl ketone, diisopropyl ketone, and methyl butenyl ketone.

In any case, the specific nature of the aliphatic aldehyde or ketone does not pertain to the novelty of this invention, as the prior art sets forth these same starting materials and others for catalytic hydrogenation to saturated alcohols.

The aldehydes or ketones to be hydrogenated are preferably passed in the vapor phase admixed with hydrogen over the catalyst. The reaction vessel containing the catalyst is suitably of tubular shape and can be subdivided into several stages. The hydrogenated vapors exiting from the reaction vessel are thereafter condensed and, if necessary, worked up by distillation — optionally under reduced pressure. The hydrogenation temperature ranges generally between 100° and 220°C, preferably between 140° and 200°C. The pressure in the reaction chamber can be selected as desired. In general, the reaction is conducted under a pressure of 1 atmosphere absolute to 300 atmospheres absolute.

In certain cases, the hydrogenation of the double bonds may not be entirely complete, for example, on the order of magnitude of hundredths or tenths of per cent, particularly when employing unsaturated aldehydes which are difficult to hydrogenate, when using a low hydrogenating pressure and with a simultaneously relatively high catalyst load. In such a case, it is suitable to pass the hydrogenated product directly thereafter over a conventional nickel and/or palladium supported catalyst provided downstream. This post treatment is advantageously conducted in the same reactor and under conditions corresponding to the main hydrogenation step. The proportion of the catalyst quantity in the post-treatment stage in the total volume of catalyst should be about 1/20 to 1/2.

A main advantage of the novel process over the previously known methods is that alcohols can be produced from the corresponding aldehydes by hydrogenation on silica gel-supported catalysts, in a very high purity and in a practically quantitative yield, without any appreciable formation of by-products. In this connection, these valuable catalyst properties are also retained even after contact with high temperatures or after catalyst regeneration. Furthermore, by regeneration, the life of the catalyst can be increased by multiples of the life or prior art silica gel supported catalysts which would not be successfully regenerated.

In general, the initial silica gel before alkali treatment has the following properties:

The surface of the used silica gel is about 100 to 400 m²/g (measured by B-BET-method) therefore a good dispersion of the active catalytic components is reached and thereby a high degree of catalytic effectivity. Another adventage of this carrier-material is given by the very low bulk density of about 350 to 600 g/l.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure in any way whatsoever.

EXAMPLE 1 a. 150 g./h. of vaporized 2-ethyl-hexenal-1 together with 1,500 Nl./h. of hydrogen is passed through a reaction tube containing 1 liter of catalyst at 160°C and 15 atmospheres absolute. Thereafter, the condensation is conducted in a condenser located within the high pressure section. The catalyst contains 9 percent by weight of copper, 3 percent by weight of nickel, 0.4 percent by weight of chromium and 0.3 percent by weight of sodium on silica gel as the support material, and was produced by applying appropriate amounts of copper carbonate, nickel formate, chromium trioxide and sodium hydroxide from an ammoniacal-aqueous solution onto the silica gel and by subsequent treatment in a hydrogen stream at about 200°C.

The amount of sodium hydroxide to be applied was previously determined in a series of samples with the available silica gel, in accordance with the above-described indicator coloring test, and is metered so that the silica gel surface is adjusted to a pH of about 7-8.

The condensed hydrogenation product is 2-ethyl-hexanol-1 and contains 0.005 percent by weight of unsaturated compounds, determined by bromination, calculated as ethyl-hexenal, as well as 0.04 percent by weight of aldehyde, calculated as ethyl-hexanal. The loss incurred by the formation of hydrocarbons is 0.1–0.2% by weight (by gas chromatography); the formation of di-2-ethyl-hexyl ether cannot be detected by gas chromatography (below 0.1 percent by weight); acetals and esters cannot be detected. The yield in 2-ethyl-hexanol-1 is thus almost quantitative.

b. The catalyst employed in (a) is subjected to a regeneration step by exposing the catalyst, after a steam treatment, to oxidation in air at 300°–350°C, the temperatures being adjusted by metering the air into a nitrogen stream. Thereafter, the catalyst is reactivated in a hydrogen stream at 200°–250°C.

Under the same conditions as in (a), 2-ethyl-hexenal-1 is passed over the thus-treated catalyst. The final product exhibits only minor differences from (a) with respect to its composition. The hydrocarbon content is 0.3 percent by weight, the content of di-2-ethyl-hexyl ether is 0.4%. After an operating period of 10 days, the content of di-2-ethyl-hexyl ether is 0.2 percent by weight. Accordingly, the yield in 2-ethyl-hexanol-1 is about 99 or 99.5 percent by weight of theory, respectively, and for all practical purposes, is as good as before the regeneration.

EXAMPLE 2

(Comparative Example with respect to Example 1)

a. 2-Ethyl-hexenal is hydrogenated to 2-ethyl-hexanol as in Example 1(a), except that the surface of the support was not adjusted to the pH range of this invention during the preparation of the catalyst. The pH of the silica gel was about 5. The condensed hydrogenation product (2-ethyl-hexanol-1) contains 0.006 percent by weight of unsaturated compounds, calculated as ethylhexenal, and determined by bromination, as well as 0.06% by weight of aldehyde, calculated as ethyl-hexanal. The loss by the formation of hydrocarbons is 0.4 percent by weight; the content of di-2-ethyl-hexyl ether is 0.3 percent by weight.

b. After performing a regeneration in accordance with Example 1(b), the final product exhibits the following analytical date: 8 percent by weight of hydrocarbons were formed; the content of di-2-ethyl-hexyl ether is 2.5 percent by weight. The yield in 2-ethyl-hexanol-1 is thus below 90% by weight of theory.

EXAMPLE 3

(Comparative Example with respect to Example 1)

2-Ethyl-hexenal is hydrogenated to 2-ethyl-hexanol as in Example 1(a) except the surface of the support of the catalyst was made strongly alkaline by the addition of 5 percent by weight of NaOH (approximately pH 12). The condensed hydrogenation product (2-ethyl-hexanol-1) contains 2 percent by weight of hydrocarbons, 0.4 percent by weight of di-2-ethyl-hexyl ether, and 0.5 percent by weight of 2-ethylcaproic acid-2-ethyl-hexyl ester. The yield in 2-ethyl-hexanol-1 is about 96 percent by weight of theory.

The use of the catalyst after regeneration does not result in any substantially different values.

EXAMPLE 4 a. One liter of a catalyst containing 9 percent by weight of copper, 3 percent by weight of nickel, 0.4 percent by weight of chromium and 0.5 percent by weight of potassium, on silica gel as the support, and which was produced in accordance with Example 1, is filled into a tube. However, sodium hydroxide is replaced by potassium hydroxide as the alkalizing agent. The amount to be applied had been determined in accordance with the above-described indicator coloring method. The pH of the silica gel surface was adjusted to about 8–9. Over the catalyst is passed, at a temperature of 180°C and an operating pressure of 0.1 atmosphere gauge, 150 g./h. of butyraldehyde — containing 0.07 percent by weight of unsaturated compounds, determined by bromination, and calculated as crotonaldehyde - which butyraldehyde was vaporized prior to this step, together with 900 Nl./h. of hydrogen. Thereafter, the product is condensed in a system having terminal cold traps. The unconsumed hydrogen is recycled in the gaseous phase into the hydrogenation stage.

The thus-condensed hydrogenation product is n-butanol and contains 0.05 percent by weight of aldehyde, calculated as butyraldehyde, and 0.007 percent by weight of unsaturated compounds, calculated as crotonaldehyde and determined by bromination. Besides, 0.3 percent by weight of di-n-butyl ether is determined by gas chromatography. The loss due to formation of hydrocarbons is below 0.5 percent by weight. Acetals cannot be detected.

b. After a regeneration procedure conducted in accordance with Example 1, the analysis of the hydrogenation product is not significantly changed, except for the content of dibutyl ether which now amounts to 0.8 percent by weight. After an operating period of 10 days, this content still is 0.4% by weight.

EXAMPLE 5

(Comparative Example with respect to Example 4)

In accordance with Example 4, n-butyraldehyde is hydrogenated, except that the support surface of the catalyst is not adjusted to the pH range of this invention (pH about 4.5).

The condensed hydrogenation product (n-butanol) contains 0.08 percent by weight of aldehyde, calculated as butyraldehyde, and 0.01 percent by weight of unsaturated compounds, calculated as crotonaldehyde, and determined by bromination. In addition, 0.8 percent by weight of di-n-butyl ether is detected by means of gas chromatography. The loss by the formation of hydrocarbons is below 0.5 percent by weight. Acetals cannot be detected.

After a regeneration step performed in accordance with Example 1, the dibutyl ether content of the hydrogenation product is 4.0 percent by weight; the loss by the formation of hydrocarbons is about 2 percent by weight.

EXAMPLE 6

Into a reaction tube are filled, in the lower section, 0.1 liter of a catalyst containing 0.5 percent by weight of palladium on aluminum oxide; thereabove, 0.1 liter of a catalyst containing 8 percent by weight of nickel on pumice; and in the upper section thereabove, 0.8 liter of a catalyst containing 3 percent by weight of copper, 1 percent by weight of nickel, 0.1 percent by weight of chromium and 0.2 percent by weight of sodium on silica gel, the surface of the latter having a pH of about 7.5. The amount of sodium hydroxide to be applied to the support was determined in accordance with Example 1.

The catalysts are activated by treatment in a hydrogen stream at about 200° C. Over this catalyst combination are passed, from the top to the bottom, at 160° C and an operating pressure of 15 atmospheres absolute, 150 g./h. of 2-ethyl-hexenal-1, which was previously vaporized, as well as 1,500 Nl./h. of hydrogen. Thereafter, a condensation step is performed in a cooling system in the high pressure section thereof. The thus-condensed hydrogenation product is 2-ethyl-hexanol-1 and contains 0.07 percent by weight of aldehyde, calculated as ethyl-hexanal; no unsaturated compounds can be detected (less than 0.0005 percent by weight.) The loss by the formation of hydrocarbons is 0.1 – 0.2 percent by weight. Only traces of di-2-ethyl-hexyl ether are found (0.1 percent by weight). The yield in 2-ethyl-hexanol-1 is thus nearly quantitative.

After a regeneration procedure executed in accordance with Example 1, the analytical composition of the hydrogenation product and the yield in 2-ethyl-hexanol-1 are not significantly changed.

EXAMPLE 7 a. Through one liter of catalyst in a tube are passed, at a temperature of 160° C and an operating pressure of 15 atmospheres absolute, 150 g./h. of 2-ethyl-hexenal-1, which was previously vaporized, together with 1,500 Nl./h. of hydrogen. Subsequently, the condensation step is performed in a cooling system in the high pressure section thereof. The catalyst contains 8% by weight of nickel and 0.3 percent by weight of sodium on silica gel as the support material, and was produced by applying corresponding amounts of nickel formate and sodium hydroxide from an ammoniacal-aqueous solution to the silica gel and subsequent treatment in a hydrogen stream at about 200° C.

The amount of sodium hydroxide to be applied was determined in accordance with the method described in Example 1(a). The pH of the silica gel surface was adjusted to about 7.

The thus-condensed hydrogenation product is 2-ethyl-hexanol-1 and contains 0.01 percent by weight of unsaturated compounds, calculated as ethyl hexenal and determined by bromination, as well as 1.5 percent by weight of aldehyde, calculated as ethyl-hexanal. The loss by the formation of hydrocarbons is 0.5 percent by weight (by means of gas chromatography), the content of di-2-ethyl-hexyl ether is 0.3 percent by weight.

b. After conducting a regeneration according to Example 1(b), the final product exhibits only minor differences in composition with respect to (a). The content of hydrocarbons is 0.8 percent by weight, and the content of di-2-ethyl-hexyl ether is 0.2 percent by weight. The yield in 2-ethyl-hexanol-1 is thus as good as before the regeneration.

EXAMPLE 8

(Comparative Example with respect to Example 7)

a. 2-Ethyl-hexenal-1 is hydrogenated to 2-ethyl-hexanol-1, as in Example 7(a), except the surface of the silica gel support was not adjusted to the pH range of this invention during the preparation of the catalyst. The pH value was about 4.5. The condensed hydrogenation product (2-ethyl-hexanol-1) contains 0.01 percent by weight of unsaturated compounds, calculated as ethyl-hexenal and determined by bromination, as well as 1.3 percent by weight of aldehyde, calculated as ethyl-hexanal. The loss by the formation of hydrocarbons is 1.0 percent by weight; the content of di-2-ethyl-hexyl ether is 0.8 percent by weight.

b. After regeneration according to Example 1(b), the final product shows the following analysis:

Eight percent by weight of hydrocarbons were formed, the content of di-2-ethyl-hexyl ether is 2.5% by weight. The yield in 2-ethyl-hexanol-1 is thus below 90% by weight of theory.

EXAMPLE 9 a. At a temperature of 180°C and an operating pressure of 0.15 atmosphere gauge, 60 g./h. of 2-ethyl-hexanal-1, previously vaporized, is passed, together with 600 Nl./h. of hydrogen, over 1 liter of catalyst confined in a tube. Thereafter, a condensation step is performed in a cooling system. The unconsumed hydrogen is reintroduced into the hydrogenation stage as the cycle gas. The catalyst contains 10 percent by weight of copper, 0.4 percent by weight of chromium and 0.25 percent by weight of sodium on silica gel as the support material — the pH of the surface was adjusted to about 6.5 and was produced by applying appropriate amounts of basic copper carbonate, chromium trioxide and sodium hydroxide from an ammoniacal-aqueous solution onto the silica gel and subsequent treatment in a hydrogen stream at about 200°C.

The thus-condensed hydrogenation product is 2-ethyl-hexanol-1 and contains still about 0.3 percent by weight of ethyl-hexanal. The loss by the formation of hydrocarbons is 0.2 percent by weight.

b. After a regeneration step in accordance with Example 1(b), the final product exhibits hardly any differences with respect to its composition from the product in (a). The loss by the formation of hydrocarbons is likewise 0.2 percent by weight.

EXAMPLE 10

(Comparative Example with respect to Example 9)

a. In accordance with Example 9(a), 2-ethyl-hexanal is hydrogenated to 2-ethyl-hexanol, but the surface of the support was not adjusted to the pH range of the present invention during the production of the catalyst. The pH was about 4.5. The condensed hydrogenation product (2-ethyl-hexanol-1) still contains about 0.3% by weight of ethyl-hexanal. The loss by the formation of hydrocarbons is 0.4 percent by weight.

After a regeneration procedure executed in accordance with Example 1, the loss by the formation of hydrocarbons is about 2 percent by weight.

EXAMPLE 11

In correspondence with Example 1(a), butanone-2 is hydrogenated under the same conditions and on the same catalyst. The final product is sec.-butanol, which still contains about 1 percent by weight of butanone; 0.1 percent by weight of water is formed.

In contrast thereto, the water formation is 0.3 percent by weight when conducting the hydrogenation on a catalyst having a silica gel support surface with a pH outside of the range provided by the present invention. After the regeneration process, under otherwise identical conditions, the formation of water is increased to 1.5 percent by weight which corresponds to a loss in yield of about 6 percent by weight.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A composition of matter suitable for use as a catalyst in the catalytic hydrogenation of aliphatic or cycloaliphatic aldehydes, ketones, or mixtures thereof to produce saturated alcohols, said composition consisting essentially of a solid silica gel support impregnated with 1-25 percent by weight of the total catalyst of a metal selected from the group consisting of copper, nickel and mixtures thereof, said composition being prepared by
   a. determining the acidity of said silica gel;
   b. neutralizing said silica gel to raise the surface pH thereof to 6-10; and
   c. applying said metal thereto while the surface pH of said silica gel remains essentially unchanged to form a catalyst having a silica gel support with a surface pH of 6-10,
   whereby the catalytic hydrogenation activity of said composition is rendered less sensitive to temperature fluctuations and contaminants and is amenable to regeneration.

2. A composition according to claim 1 wherein said silica gel support has a surface pH of 6.5-9.

3. A composition according to claim 1 wherein said silica gel support has a surface pH of about 7.

4. A composition according to claim 1 wherein said silica gel has a surface area of 100-400 m$^2$/g and a bulk density of 350-600 g/l.

5. A process for preparing a composition according to claim 1, suitable for use as a catalyst in the catalytic hydrogenation of aliphatic or cycloaliphatic aldehydes, ketones, or mixtures thereof to produce saturated alcohols, said composition consisting essentially of a solid silica gel support impregnated with 1-25 percent by weight of the total catalyst of a metal selected from the group consisting of copper, nickel and mixtures thereof, said composition being characterized by the silica gel support having a surface pH of 6-10, comprising:
   a. determining the acidity of said silica gel;
   b. neutralizing said silica gel to raise the surface pH thereof to 6-10; and
   c. applying said metal thereto while the surface pH of said silica gel remains essentially unchanged to form a catalyst having a silica gel support with a surface pH of 6-10.

6. A process as defined by claim 5 wherein said surface pH is raised to 6.5-9.

7. A process as defined by claim 5 wherein said surface pH is raised to about 7.

8. A process as defined by claim 5 wherein said neutralizing is effected with an aqueous solution of an alkali metal hydroxide or an alkaline earth metal hydroxide.

9. A process as defined by claim 8 wherein said aqueous solution is of sodium hydroxide or potassium hydroxide.

10. A process as defined by claim 5 wherein said neutralizing is effected with an aqueous solution of a salt of an alkali metal or alkaline earth metal with a weak acid.

11. A process as defined by claim 5 wherein said neutralizing and said metal-applying are effected simultaneously.

12. A process as defined by claim 5 wherein said metal is applied by impregnating said silica gel with a salt of said metal and converting said salt to said metal.

13. A process as defined by claim 5 wherein said salt is impregnated as an aqueous ammonical solution.

14. A process as defined by claim 5 wherein said salt is converted to said metal by decomposing said salt to its oxide and reducing said oxide to said metal.

15. A process as defined by claim 5, further comprising titrating an aliquot of initial solid silica gel having a pH of about 3-5 to determine the amount of alkali necessary to raise the surface pH of the remaining silica gel to 6-10.

16. A composition of matter as defined by claim 1 wherein said silica gel in step (a) has a surface pH of 3-5.

17. A process as defined by claim 5 wherein said silica gel in step (a) has a surface pH of 3-5.

18. A composition as defined by claim 1 wherein said metal is substantially only nickel.

19. A composition as defined by claim 1 wherein said metal is substantially only copper.

20. A composition as defined by claim 1 wherein said metal is a mixture of nickel and copper with the provision the nickel comprises not more than about 8 percent by weight of the total catalyst.

21. A composition as defined by claim 1 comprising a further step of treating the catalyst with hydrogen at 200°–250° C.

22. A process as defined by claim 5 comprising a further step of treating the catalyst with hydrogen at 200°–250° C.

* * * * *